Sept. 14, 1948. R. P. CRAIG ET AL 2,449,161
BOTTLE CAPPER
Filed Dec. 26, 1945

INVENTORS
RALPH P. CRAIG
AND
JOHN W. NORGAUER

BY
ATTORNEY

Patented Sept. 14, 1948

2,449,161

UNITED STATES PATENT OFFICE 2,449,161

BOTTLE CAPPER

Ralph P. Craig, Los Angeles, and John W. Norgauer, Hollywood, Calif.

Application December 26, 1945, Serial No. 637,181

2 Claims. (Cl. 226—88)

This invention relates to a device for applying screw caps to bottles and the like.

One object of the invention is to provide improved means for screwing caps on bottles or other containers. Another object is to provide a capper which applies a screw cap to a selected uniform degree of tightness. Still another object is to provide a chuck device for engaging a bottle cap during the capping operation which does not mar or discolor the finish on the cap. These and other objects are attained by my invention which will be understood from the following description and the drawing in which:

Fig. 1 is a side elevation of the clutch and chuck devices as assembled with a driving mechanism;

Fig. 2 is a side elevational view of the clutch and chuck shown partly in section and with parts broken away;

Fig. 3 is a cross-sectional view taken on the line 3—3 of Fig. 2;

Fig. 4 is a cross-sectional view taken on the line 4—4 of Fig. 2;

Fig. 5 is a cross-sectional view taken on the line 5—5 of Fig. 2;

Fig. 6 is a cross-sectional view taken on the line 6—6 of Fig. 2;

Fig. 7 is a view similar to Fig. 6 showing the chuck for the caps in clamping position;

Fig. 8 is a fragmentary cross-sectional view taken on the line 8—8 of Fig. 3;

Fig. 9 is a view similar to Fig. 8 showing the pivoted cam member in raised position against the pressure ring;

Fig. 10 is a perspective view of the hinged clamping segment of the chuck;

Fig. 11 is a perspective view of the chuck body showing the fixed portion of the clamping ring.

Referring to the drawings a screw-cap applying device shown generally as 15 is connected to a driving mechanism M through a sprocket chain 14 on a spocket wheel 16, the driving means including a motor, a speed reducer and bevel gear drive, the bottle to be capped being represented as B, having a threaded neck upon which may be fitted the screw cap C. The bottle capper in assembled form is adapted to be attached to a work table with the clutch member substantially enclosed except for the spring adjustment screw and the chuck, the latter overhanging the edge of the table so that the bottles with the cap partially screwed on may be pressed by hand into the chuck whereupon the upward pressure causes an engagement of the clutch mechanism, and the cap C is turned until it is tightened to a preselected amount by the pressure on the spring pressure disk 28 as will be further described. The clutch mechanism consists of a shaft 22 upon which is mounted for rotation a sprocket wheel 16 having cam-engaging driving pins 17 extending from the top surface at an intermediate position between the shaft and the teeth of the sprocket. These driving pins 17 are adapted to engage the pivoted cam members 18 pivoted in the retaining disk 20 which is attached by set screws 21 holding the disk in fixed relation to the shaft. The cam members 18 are pivoted to turn in slots in the retaining disk 20 on pins 19, the cams having a portion projecting below the lower surface of the retaining disk 20 adapted to at times engage the driving pins 17 in the sprocket 16. A spring pressure disk 28 rotating freely on the shaft, the lower surface being in contact with the upper surface of the retaining disk 20 and with the upper surfaces of the cam members 18 is adapted to serve as a bearing plate for the spring 29 whose compression may be varied by the spring adjusting nut 30 which is held in a selected position by the lock nut 31, both threaded on the upper end of the shaft 22. The shaft 22 is provided with a flange member 27 disposed below the sprocket 16. A vertical lifting pin 25 is provided in a hole in the shaft extending from its lower end to a point above the sprocket 16. The lifting pin 25 is provided at its upper end with a horizontal arm 23 which extends through slots 26 in the shaft at a point immediately above the top surface of the flange 27, these slots permitting the horizontal arm 23 on the vertical lifting pin 25 to raise the sprocket wheel 16 so that the driving pins 17 are brought into position to engage the cams 18. The vertical lifting pin 25 is actuated by the stem 35 of the bottle cap chuck 33. The lower end of the shaft 22 is provided with an inverted U or bayonet slot 37 which is engaged by the pin 38 on the side of the stem 35. When the bottle cap chuck 33 is raised as by contacting it with the bottle and cap, the pin 38 moves up in the closed end of the inverted U slot 37 so that the stem 35 presses against the lower end of the vertical lifting pin 25.

Any suitable bottle cap chuck device may be used with the clutch device but we prefer to use the chucking device shown. This consists of a recessed body portion 34 having the stem 35 extending therefrom and containing within its recess the rotatable clamping ring housing 40 which consists of a recessed disk body having a half-ring segment extending from the periphery, this ring segment being provided with a groove 41 for retaining a rubber clamping ring 42. The disk body housing 40 is also provided with a pin 44 for pivoting a hinged grooved segment 45. A pin 48 is also provided to fix the relation between the end of the hinged segment 45 away from the pivot 44 and the housing 34. A split rubber clamping ring 42 is adapted to fit in the groove 41 of the hinged segment 45 and the fixed segment 40, a stop lug 43 being provided at the end of said groove to hold the ring from circumferential movement. A rubber disk 50 is provided in the recess of the housing 40 below the rubber clamping ring 42 to provide frictional means engaging the end of the bottle cap for actuating the hinge segment to effect the clamping action on the sides of the bottle cap.

Bottle cap chucks of various sizes may be provided to fit various cap sizes. The chuck may be easily changed from one size to another by means of the bayonet fitting in the hollow end of the shaft and the pin 38 in the stem 35 of the chuck, as described. A retaining ring 51 having frictional engagement with the side walls of the housing 34 is adapted to hold the other chuck members in place in the recess of the housing.

The chucking device will engage the bottle cap when the top surface of the bottle cap is pressed against the rubber disk 50, the fractional resistance causing slight rotation of the clamping ring housing, and this slight rotation causes the hinged segment 45 to close and clamp against the sides of the bottle cap, the split rubber ring 42 being in direct contact with the bottle cap. As soon as the cap has been screwed on to the bottle neck with sufficient amount of tension as regulated by the spring tension of the clutch, the shaft and attached chuck no longer revolves because the driving pins 17 trip the cam members 18 instead of engaging them for rotation.

The advantages of the device will be apparent. The clutch mechanism may be used to drive chuck members for various sized bottle caps. The finish on the bottle caps is not affected in any way by the contact with the rubber portions of the chuck because at no time is there any rubbing action since the chuck member closes and securely clamps the cap against any slipping. By adjusting the spring tension on the clutch, the bottle cap may be screwed down to any desired tightness. Since the sprocket 16 is rotated continuously, it is unnecessary for the operator to start and stop the motor and the bottles may be capped by an operator using only one hand, and if desired, the other hand may be used to start the caps on the thread.

We claim:

1. In a bottle capper for applying screw caps, chuck means for the caps comprising a recessed casing having a stem adapted to be at times rotated by a clutch means actuated by rotary means, a recessed disk body adapted to turn in the recess of said casing, and having a fixed segment of a clamping ring attached around the rim of said recess, a segmental clamping ring member hinged to said body in position to complete a ring clamp, said hinged member being also pivoted at the end opposite the said hinged end to said casing, and a split rubber clamping ring within said clamping ring members.

2. In a bottle capper, for applying screw caps, chuck means for the caps comprising a recessed casing having a stem adapted to be at times rotated by a clutch means actuated by rotary means, a recessed disk body adapted to turn in the recess of said casing, and having an inside grooved fixed segment of a clamping ring attached around the rim of said recess, a segmental clamping ring member hinged to said body in position to complete a ring excepting a gap to permit clamping movement of said segment, said hinged member being also pivoted at the end opposite the said hinged end to said casing, a split rubber clamping ring within said fixed and hinged segmental ring members, a rubber friction disk in the recess of said disk body and a retainer ring holding said other parts of the chuck within said recessed casing.

RALPH P. CRAIG.
JOHN W. NORGAUER.

REFERENCES CITED

The following references are of record in the file of this patent:

UNITED STATES PATENTS

| Number | Name | Date |
|---|---|---|
| 1,208,529 | Evans | Dec. 12, 1916 |
| 1,883,164 | Vassakos | Feb. 24, 1931 |
| 1,895,037 | Herndon | Jan. 24, 1933 |
| 2,253,466 | Grohn | Aug. 19, 1941 |